(12) United States Patent
Pannwitz

(10) Patent No.: US 6,791,809 B2
(45) Date of Patent: Sep. 14, 2004

(54) CHARGE/DISCHARGE PROTECTION CIRCUIT

(75) Inventor: Axel Pannwitz, Lenningen (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 17 days.

(21) Appl. No.: 10/304,269

(22) Filed: Nov. 26, 2002

(65) Prior Publication Data

US 2003/0099075 A1 May 29, 2003

(30) Foreign Application Priority Data

Nov. 29, 2001 (DE) .......................................... 101 58 494

(51) Int. Cl.$^7$ .............................................. H02H 3/20
(52) U.S. Cl. ...................................................... 361/90
(58) Field of Search .................... 361/90, 56; 320/134, 320/128, 13

(56) References Cited

U.S. PATENT DOCUMENTS

| | | | | |
|---|---|---|---|---|
| 5,547,775 A | * | 8/1996 | Eguchi et al. | 320/118 |
| 5,554,919 A | * | 9/1996 | Uchida | 320/132 |
| 5,684,381 A | * | 11/1997 | Ohtsuka | 320/134 |
| 5,703,463 A | * | 12/1997 | Smith | 320/134 |
| 5,838,076 A | | 11/1998 | Zarrabian et al. | 307/115 |
| 5,896,260 A | * | 4/1999 | Esposito | 361/79 |
| 6,028,415 A | * | 2/2000 | Nagai et al. | 320/162 |
| 6,144,327 A | * | 11/2000 | Distinti et al. | 341/126 |
| 6,169,393 B1 | | 1/2001 | Hashimoto | 323/354 |
| 6,198,252 B1 | * | 3/2001 | Mukainakano | 320/128 |
| 6,608,470 B1 | * | 8/2003 | Oglesbee et al. | 320/136 |
| 6,614,205 B2 | * | 9/2003 | Nakashimo | 320/134 |

FOREIGN PATENT DOCUMENTS

| | | | | |
|---|---|---|---|---|
| DE | 19737775 A1 | 8/1997 | .......... | H01M/10/44 |
| DE | 10149234 A1 | 10/2001 | ........... | G05F/1/613 |
| JP | 10066251 A | 6/1998 | ............ | H02H/7/18 |

OTHER PUBLICATIONS

DS–01–036 "Charge/Discharge Protection Circuit for a Rechangeable Battery", filed Jan. 24, 2002, Ser. # 10/057,490, assigned to a common assignee.
DS–01–022 "Charge/Discharge Protection Circuit" filed Aug. 2, 2002, Ser. # 10/210,958, assigned to a common assignee.

* cited by examiner

Primary Examiner—Brian Sircus
Assistant Examiner—James A Demakis
(74) Attorney, Agent, or Firm—George O. Saile; Stephen B. Ackerman

(57) ABSTRACT

A charge/discharge protection circuit with n parallel load current switches and a control logic for the latter, which in an over-voltage event disconnects the battery from the charge/discharge terminals through sequentially controlled melting of integrated fusible links, where the control logic in an over-voltage event, simultaneously closes all load current switches, then following sequentially opens a first number of the load current switches, and at the same time closes the switch segments of a short-circuit switch array associated with the respective load current switch, so that the associated fusible links melt sequentially. After the opening of this first number of load current switches the latter closes again and at the same time the remaining number of still closed load current switches opens, as well as continues to sequentially close the remaining switch segments.

18 Claims, 3 Drawing Sheets

CHARGE/DISCHARGE PROTECTION CIRCUIT

RELATED PATENT APPLICATIONS

DS01-036, Charge/Discharge Protection Circuit for a Rechargeable Battery, title filing date: Jan. 24, 2002. Ser. No. 10/057490, assigned to a common assignee.

DS02-022, Charge/Discharge Protection Circuit, title filing date: Aug. 2, 2002. Ser. No. 10/1210958, assigned to a common assignee.

BACKGROUND OF THE INVENTION

1. Field of the Invention

The invention relates to a charge/discharge protection circuit for a rechargeable battery, and more particularly to a charge/discharge protection circuit where the fusible links are melted sequentially allowing the use of a smaller area on an integrated circuit.

2. Description of the Related Art

Circuits have been described referring to charge/discharge protection circuits for a rechargeable battery comprising at least one rechargeable cell, with a control logic which opens or closes n parallel load current switches depending on the magnitude of the voltage at the battery terminals, the voltage at the charge/discharge terminals of the protection circuit, and the charge or discharge current. Where that control logic comprises an over-voltage detector which in case of an over-voltage disconnects the battery from the charge/discharge terminals through sequentially controlled melting of integrated, battery-side parallel coupled fusible links. Each of which can be coupled to the oppositely poled battery connection via an in series connected associated load current switch and an associated, controllable switch segment of a short-circuit switch array.

Such circuits are known from the above referenced Related Patent Applications, which is expressly referenced herewith. In particular, this circuit can be disposed between a single lithium-ion cell and the electronics of a mobile phone. It protects the battery, respectively the cell from a dangerous overcharge and can be produced with a significantly lower electric strength than is required in a worst-case scenario, and, therefore, at a favorable cost. In the case of an over-voltage, the fusible links will be destroyed individually one after another. The battery is thereby disconnected permanently from the over-voltage. The destruction of the protection circuit is knowingly accepted. To insure that the protection circuit is not already destroyed by the over-voltage before the last fuse has melted, the protection circuit comprises, parallel to the charge/discharge terminals, a semiconductor switch is immediately switched into its conductive state by the over-voltage detector in case of an over-voltage, so that the over-voltage collapses due to the short-circuit. Because the semiconductor switch for that reason must have a high current carrying capacity, it requires a comparatively large area of real estate on the chip and therefore increases its cost.

The task of the invention is to create a protection circuit of the above mentioned type which, while providing the same protection, can be fitted onto an area-wise smaller and therefore more economical chip.

Relating to the invention at hand is U.S. Pat. No. 5,703,463 (Smith) which describes the use of MOSFET switches and fail-safe elements such as fuses or circuit breakers to protect a battery from an overcharge. Other protection such as discharge protection are not considered.

Relating to the invention at hand are also two untranslated German patents:

DE 19737775 (Smith) is a translation of the above cited U.S. Patent.

DE 10149234 (Smith) describes a shunt control protected by a plurality of fusible links designed to insure that the fuses are activated, i.e., melted. This is achieved by using an operational amplifier with feedback.

Also related to the invention appears to be an untranslated Japanese patent 10-66251 where one drawing shows a parallel circuit of a fuse in series with a switching element with other components and a battery arranged around it.

BRIEF DESCRIPTION OF THE DRAWINGS

Use of the same reference number in different figures indicates similar or like elements.

DESCRIPTION OF THE PREFERRED EMBODIMENT

Figure 1:
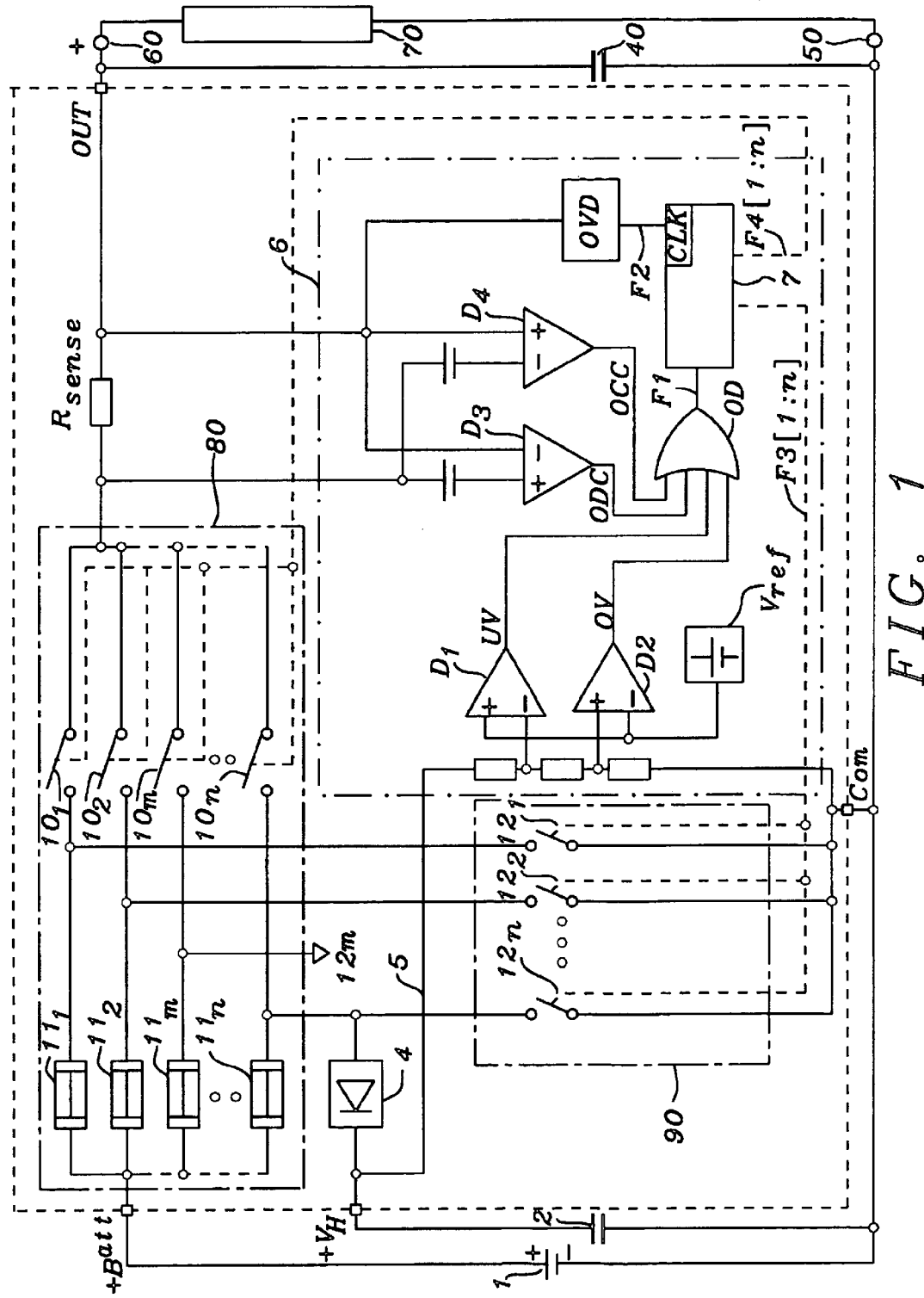
FIG. 1 is a circuit diagram of the preferred embodiment of the invention.

The present invention solves the task previously described in that the control circuit, in an over-voltage event, simultaneously closes all load current switches, then following, sequentially opens a first number of load current switches, and at the same time closes the switch segment of the short-circuit switch array associated with the respective load current switch, so that the associated fusible links melt sequentially. After the opening of this first number of load current switches the latter closes again and at the same time the remaining number of still closed load current switches opens, as well as continues to sequentially close the remaining switch segments, so that until the complete disconnect of the battery there exists at all times a low-resistance path between the charge/discharge terminals of the protection circuit to protect the latter from the over-voltage.

This low-resistance path, therefore, initially traces via all closed load current switches and the battery, later via the again closed first number of load current switches and the already closed short-circuit switches. The initial current flow through the battery causes no dangerous overload (nor discharge) yet, because the disconnect process is completed within milliseconds (maximally within one second).

The central idea of the invention therefore consists in reducing a recognized over-voltage via low-resistance current paths by utilizing the already existing in-parallel deployed load current switches. This ensures that the protection circuit stays functional until the final disconnect of the battery when the last fuse is destroyed. In contrast to the circuit of the starting point, in the event of an over-voltage all load current switches will therefore be closed initially, and during the following, sequential melting of the fuses a sufficient number of the load current switches will always be kept closed, so that the over-voltage will have a low-resistance short-circuit initially via the battery, and further on via the already closed switch segments of the short-circuit switch array.

Appropriately, at least those circuit components of the control logic generating the control signals for the switch segments receive their supply voltage from an auxiliary voltage source, in particular from a charged buffer capacitor. Thereby the function of the protection circuit is safeguarded even when the external over-voltage collapses due to the generated low-resistance short-circuit path, or conversely, when it is so high that it has led to a destruction of other parts of the control logic intended for the normal function of the protection circuit.

One preferred embodiment consists of charging the buffer capacitor, which forms the auxiliary voltage source, to the battery voltage via a semiconductor. In doing so the semiconductor opens when the battery voltage falls below a predetermined value or when the over-voltage detector generates a control signal in the case of an over-voltage.

In a second preferred embodiment the auxiliary voltage source comprises a buffer capacitor which is charged up via a charge pump to the maximally allowable operating voltage of the control logic.

Appropriately, the over-voltage detector receives as input voltage the voltage at the charge/discharge terminals. This avoids the disadvantage of a proposal according to the state of the technology, whereby an external over-voltage is only then recognized as such when it has also caused an over-voltage at the battery via the corresponding battery charge current.

The over-voltage detector may in particular comprise a bistable flip-flop circuit, which switches to its second stable state in the event of an over-voltage, so that even an only briefly applied over-voltage triggers the sequence of control signals which produces the low-resistance short circuit.

In a preferred embodiment, the over-voltage detector is followed by a clock generator and a digital switching circuit, whereby the over-voltage detector, in an over-voltage event, generates a signal enabling the clock generator. And whereby the digital switching circuit comprises a number of successive D flip-flops which correspond to the number of switches to be controlled. Whereby, via the clock signal, the D flip-flops are flipped sequentially into their second stable state. And whose outputs then deliver serially, on one hand the control signals for the switch segments of the short-circuit switch array, and on the other hand via logic network elements the control signals for the load current switches. How a logic network circuit satisfying such a function is to be realized is known to those skilled in the art.

With the exception of capacitors, all circuit components are integrated on one chip.

Figure 2:
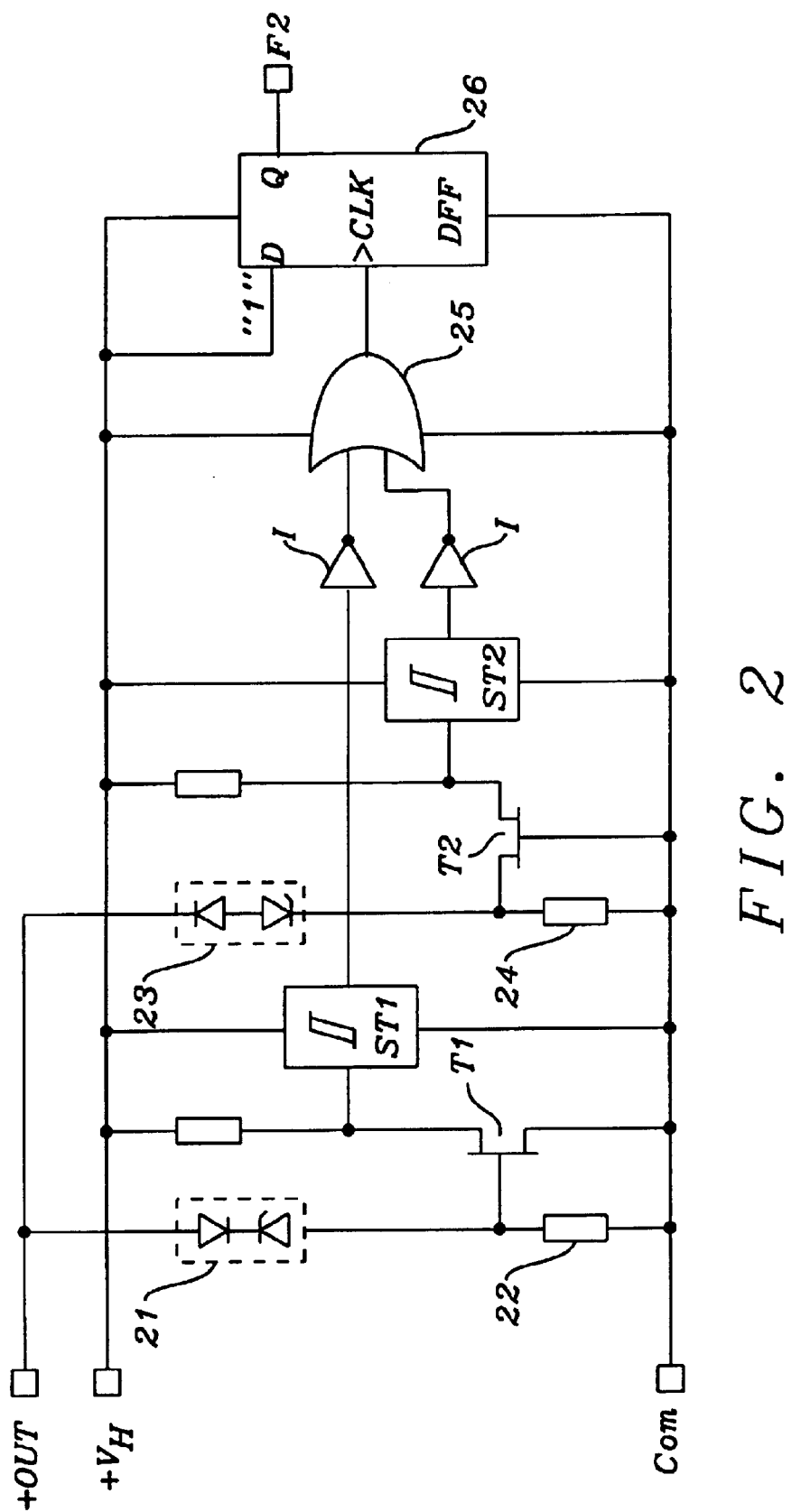
FIG. 2 a simplified block diagram of the over-voltage detector of FIG. 1.
Figure 3:
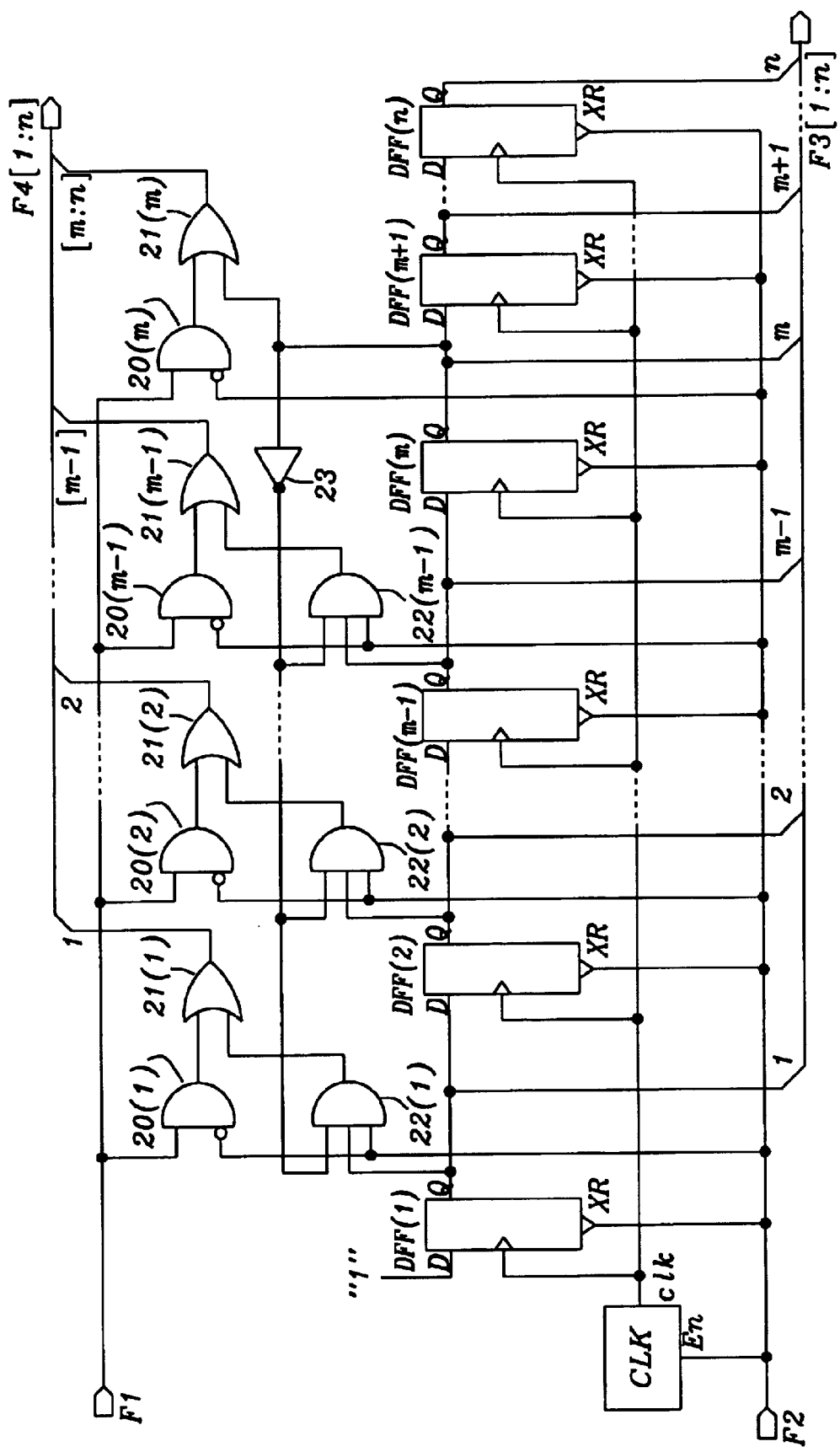
FIG. 3 a block diagram of the preferred embodiment of the digital switching circuit, including the clock generator, following the over-voltage detector.

We now describe the preferred embodiment of the present invention in more detail with reference to FIGS. 1 to 3. The protection circuit illustrated in FIG. 1 is located as an integrated circuit between the terminals of a Li-Ion cell 1 and two charge/discharge terminals 50 and 60, paralleled to which is a filter-capacitor 40 as protection against steeply sloped voltage increases. Terminals 50 and 60 are coupled to an external device 70. The protection circuit has the external connections Com, +Batt and Out as well as +$V_H$. The latter is connected via a buffer capacitor 2 with the reference potential Corn. Buffer capacitor 2 is normally charged to the battery voltage via semiconductor switch 4 (indicated as a diode). If this supply voltage drops away then semiconductor switch 4 opens and the buffer capacitor 2 supplies, via line 5, power for a time for essential parts of the integrated circuit. A charge pump circuit may also be provided in place of semiconductor switch 4, where the charge pump circuit charges the buffer capacitor 2 to the intended maximum gate voltage as dictated by the technology of the integrated circuit.

A current sensing resistor $R_{sense}$ is placed between Out and +Batt in series with a first serial circuit 80, where first serial circuit 80 comprises a plurality of parallel coupled series circuits, in turn each comprising a load current switch $10_1, 10_2, \ldots 10_n$ and an integrated fusible link $11_1, 11_2, \ldots 11_n$. A second serial circuit 90, comprising short circuit switches 12, is coupled to the fusible links 11. Each connection node between a load current switch $10_X$ and a fusible link $11_X$ is connected to the reference potential Corn via its own short-circuit switch $12_1, 12_2, \ldots 12_n$. The entire group of these short-circuit switches will be referred to from here on as short-circuit switch array, and the individual switches as switch segments.

A control logic, pictured in simplified form within dash-dotted block 6, generates by generally known means through differential amplifiers D1 and D2 a battery under-voltage signal UV and a battery over-voltage signal OV, provided the voltage of the Li-Ion cell 1 is outside of the predetermined tolerance range. The control logic further generates from the voltage drop across $R_{sense}$ by means of differential amplifiers D3 and D4 the output signals OCD, OCC, respectively, when reaching the maximum charge current or the maximum discharge current, respectively. Output signals UV, OV, OCD and OCC of differential amplifiers D1 to D4 are coupled into OR-gate OD which supplies in each of the mentioned instances an error signal F1 to a digital switching circuit 7, which will be explained in more detail by reference to FIG. 3.

The potential at terminal Out not only is present at the corresponding inputs of D3 and D4, but also at the input of an over-voltage detector OVD, which in the event of an over-voltage generates an error signal F2, which is also supplied to digital switching circuit 7.

An embodiment of the over-voltage detector OVD is illustrated in FIG. 2. The designations of the external connections correspond to those of FIG. 1. Placed between Out and Com is the series circuit comprising a first trigger element 21 and a resistor 22 as well as a second trigger element 23 and a second resistor 24. Trigger elements 21, 23 are illustrated only symbolically as the series connection of a zener diode and a back current diode, wired back-to-back. When exceeding the predetermined voltage limit in the positive or negative direction the corresponding trigger element becomes conductive and with it the respective, following MOS transistor T1 or T2, which in turn sets to "0" or "L" the following Schmitt-Triggers ST1, ST2, respectively. The outputs of the Schmitt-Triggers are coupled via Inverter I with the inputs of a NAND-gate 25, whose output in turn is connected with the clock input of a D flip-flop 26. Its D-input is normally at "1" or "H". The output Q of flip-flop 26, therefore, goes to "H" when at the clock input an impulse arrives from OR-gate 25. The over-voltage detector behaves, therefore, like a bistable flip-flop. The output level "1" or "H" represents the error signal F2 at the terminal of the same name.

FIG. 3 is an embodiment of the digital switching circuit 7 in FIG. 1, which generates from error signals F1 and F2 sequential control signals F3 [1:n] for the switch segments $12_1$ to $12_n$ of the short-circuit switch array in FIG. 1, and control signals F4 [1:n] for the load current switches $10_1$ to $10_n$ in FIG. 1. The latter are in this example realized in PMOS technology, and open therefore when their control signal is at level "1", and close to the conductive state when their control signal is at level "0".

The connection F1, by which error signal F1 is supplied, is coupled to the first inputs of AND gates 20(1) to 20(m).

Whose second inputs receive the negated error signal F2, i.e., the level "1", as long as OVD does not detect an over-voltage and when therefore the error signal F2 is at "0". The outputs of AND gates 20 [1:m] are coupled to the first inputs of OR gates 21 [1:m]. Whose outputs supply the control signals F4 [1:n] for load current switches $10_1$ to $10_n$ in FIG. 1, whereby OR gate 21(m) supplies a common control signal for load current switches 10 [m:n]. When error signal F1 switches to "1", then correspondingly all control signals F4 [1:n] switch simultaneously to "1", i.e., all load current switches $10_1$ to $10_n$ open simultaneously. This is the case, e.g., when control logic 6 in FIG. 1 generates one of the signals UV, OV, OCD or OCC.

The digital switching circuit 7 further comprises a clock generator CLK which starts when there is applied at its input En the error signal F2 with the level "1", which is supplied via terminal F2. The clock signal clk is directed to the clock inputs of a number of successive D flip-flops DFF [1 :n], where the number of D flip-flops corresponds to the number of to be controlled load current switches 10 and of short-circuit switch segments 12 in FIG. 1. The terminal F2 is, moreover, coupled in parallel to all inputs XR of these flip-flops. The input D of the first flip-flop DFF(1) is tied permanently to "1". The output Q belonging to it is coupled to input D of DFF(2), whose output Q is coupled to the input D of the following DFF, and so on. When error signal F2 with level "1" is present, then as a consequence outputs Q of DFFs [1:n] switch to "1" sequentially clocked by the clock signal clk and, therefore, supply the sequence of control signals F3 [1:n] for the corresponding switch segments 12 [1:n] of the short-circuit switch array, which thereby close sequentially.

Associated with D flip-flops DFF [1:(m−1)] are AND gates 22 [1:(m−1)]. Each of these AND gates has three inputs. All first inputs are coupled to terminal F2. The second input of each AND gate is coupled to the output Q of D flip-flop of same ordinal number. All third inputs are coupled via a common inverter 23 to the output Q of DFF(m). The outputs of all AND gates [1:(m−1)] are coupled to the second inputs of OR gates [1:(m−1)]. However, the second input of OR gate 21(m) is coupled to the output Q of DFF(m), to which is also coupled the inverter 23.

The action of the circuit is as follows: If only error signal F1 appears, i.e., the level "1" is present at terminal F1, then, as already mentioned, all control signals F4 [1:n] generate the level "1", so that all load current switches $10_1$ to $10_n$ in FIG. 1 open.

When the over-voltage detector OVD generates the error signal F2 with level "1", all AND gates 20 [1:m] block, so that all control signals F4 [1:n] take level "0" at the same time, whereby all load current switches $10_1$ to $10_n$ are closed at the same time. Thus, charge/discharge terminals 50, 60 are low-resistance short-circuited via battery 1. Only when there is a high over-voltage and a low internal resistance of the external voltage source will all fuses $11_1$ to $11_n$ already melt now, and thereby totally disconnect battery 1. Otherwise, the error signal F2 will start the clock generator CLK, so that the outputs Q of the D flip-flops DFF [1:n] successively generate the control signals F3 [1:n], as also already mentioned. In the same clock cycle the logic AND condition for each AND gate 22(1) to 22(m−1) is satisfied, so that control signals F4 [1:(m−1)] switch from "0" to "1". Whereby the corresponding load current switches open at the same point in time at which the switch segments of the same ordinal number close. Correspondingly, fuses $11_1$ to $11_{m-1}$ melt successively.

When in the next clock cycle the output Q of D flip-flop DFF(m) switches to "1", then all AND gates 22 [1:(m−1)] will be blocked by inverter 23. Thus all control signals F4 [1:(m−1)] move to level "0", so that the successively opened load current switches $10_1$ to $10_{m-1}$ all close simultaneously, and all remaining load current switches $10_m$ to $10_n$ concurrently receive via OR gate 21(m) the control signal "1", whereupon they open. Thus there exists at all times until the last fuse $11_n$ is melted a low-resistance short-circuit path, initially via the battery then via the already closed load current switches and all switch segments which are already closed and which remain in this state.

While the invention has been particularly shown and described with reference to the preferred embodiments thereof, it will be understood by those skilled in the art that various changes in form and details may be made without departing from the spirit and scope of the invention.

What is claimed is:

1. A charge/discharge protection circuit for a battery, comprising:

a protection circuit having a first, a second, and a third terminal, where said first and said second terminal are coupled to battery terminals of at least one rechargeable cell, where said second and said third terminal are coupled to charge/discharge terminals of an external device, said protection circuit protecting said battery from an over-voltage from said external device, said protection circuit further comprising:

a first serial circuit comprising a fusible link and a load current switch, said first serial circuit coupled between said first terminal and said third terminal, where said load current switch is controlled by a control logic, and where a plurality n of said first serial circuits are coupled in parallel, such that there are n said fusible links and n said load current switches;

a second serial circuit comprising a switch segment, where said second serial circuit is coupled between the junction of said fusible link and said load current switch and said second terminal, where said switch segment is controlled by said control logic, and where a plurality n of such second serial circuits are coupled in parallel, such that there are n switch segments, where the plurality n of such switch segments is called a short-circuit switch array; and said control logic coupled between said second and said third terminal, said control logic detecting the conditions of under-voltage and over-voltage at said first and said second terminals, over-current, under-current, and over-voltage at said second and said third terminals, where said control logic generates first and second control signals in response to said conditions, such that said first control signal controls the opening and closing of each of said switch segments of said short-circuit switch array and said second control signal controls the opening and closing of each of said load current switches, were said second control signal causes all n of said load current switches to open simultaneously, thereby separating said battery from said external device, were, upon detecting an over-voltage at said second and said third terminals, said first and said second signal causes all n of said load current switches to close simultaneously, then to open sequentially said short-circuit switch array, thereby causing to melt sequentially all n of said fusible links, to open immediately and sequentially a first number of said load current switches after having closed all n of them earlier, following the opening of the last of said first number of said load current switches to then close simultaneously said first number of said load current switches, which then is followed by the simultaneous opening of the second remaining number of said load current switches.

2. The charge/discharge protection circuit of claim 1, wherein at least those circuit components of said control logic which generate said first control signal for said short-circuit switch array receive their supply voltage from an auxiliary voltage source.

3. The charge/discharge protection circuit of claim 2, wherein said auxiliary voltage source is charged via a semiconductor circuit to the battery voltage, where said semiconductor circuit switches to its non-conductive state when said battery voltage falls below a predetermined value.

4. The charge/discharge protection circuit of claim 3, wherein said semiconductor circuit switches to its non-conductive state when said over-voltage at said second and said third terminal is detected.

5. The charge/discharge protection circuit of claim 2, wherein said auxiliary voltage source is charged via a charge pump to the maximally allowable operating voltage for said control logic.

6. The charge/discharge protection circuit of claim 2, wherein said auxiliary voltage source is a buffer capacitor.

7. A charge/discharge protection circuit for a battery, comprising:
   a protection circuit having a first, a second, and a third terminal, where said first and said second terminal are coupled to the battery terminals of at least one rechargeable cell, where said second and said third terminal are coupled to the charge/discharge terminals of an external device, said protection circuit protecting said battery from an over-voltage from said external device, said protection circuit further comprising:
   a first serial circuit comprising a fusible link and a load current switch, said first serial circuit coupled between said first terminal and said third terminal, where said load current switch is controlled by a control logic, and where a plurality n of said first serial circuits are coupled in parallel, such that there are n said fusible links and n said load current switches;
   a second serial circuit comprising a switch segment, where said second serial circuit is coupled between the junction of said fusible link and said load current switch and said second terminal, where said switch segment is controlled by said control logic, and where a plurality n of such second serial circuits are coupled in parallel, such that there are n switch segments, where the plurality n of such switch segments is defined as a short-circuit switch array; and
   said control logic coupled between said second and said third terminal, said control logic further comprising an over-voltage detector and a digital switching circuit, where said control logic generates a first error signal when detecting the conditions of under-voltage and over-voltage at said first and said second terminals, over-current and under-current at said second and said third terminals, where said digital switching circuit generates with input from said over-voltage detector a second error signal when detecting the condition of over-voltage at said second and said third terminals, where said first and said second error signal are inputs to said digital switching circuit, where said digital switching circuit generates a first and a second control signal, such that said first control signal controls the opening and closing of each of said switch segments of said short-circuit switch array and said second control signal controls the opening and closing of each of said load current switches, such that when only said first error signal is active it causes all said load current switches to open simultaneously, thereby separating said battery from said external device, and such that when only said second error signal is active it causes all n of said load current switches to close simultaneously, then to open sequentially said short-circuit switch array, thereby causing to melt sequentially all n of said fusible links, to open sequentially a first number of said load current switches immediately after having closed all n of them earlier, then following the opening of the last of said first number of said load current switches to close simultaneously said first number of said load current switches, which then is followed by the simultaneous opening of the second remaining number of said load current switches.

8. The charge/discharge protection circuit of claim 7, wherein at least those circuit components of said control logic which generate said first control signal for said short-circuit switch array receive their supply voltage from an auxiliary voltage source.

9. The charge/discharge protection circuit of claim 8, wherein said auxiliary voltage source is charged via a semiconductor circuit to the battery voltage, where said semiconductor circuit switches to its non-conductive state when said battery voltage falls below a predetermined value.

10. The charge/discharge protection circuit of claim 9, wherein said semiconductor circuit switches to its non-conductive state when said over-voltage at said second and said third terminal is detected.

11. The charge/discharge protection circuit of claim 8, wherein said auxiliary voltage source is charged via a charge pump to the maximally allowable operating voltage for said control logic.

12. The charge/discharge protection circuit of claim 8, wherein said auxiliary voltage source is a buffer capacitor.

13. The charge/discharge protection circuit of claim 7, wherein said over-voltage detector comprises a bistable flip-flop circuit which switches into its second stable state in an over-voltage event.

14. The charge/discharge protection circuit of claim 7, wherein said digital switching circuit comprises a plurality of successive bistable flip-flop circuits equal in number to said number n of said load current switches and switch segments to be controlled.

15. The charge/discharge protection circuit of claim 7, wherein said digital switching circuit comprises a clock generator, where said clock generator is enabled by said second error signal.

16. The charge/discharge protection circuit of claim 15, wherein said bistable flip-flop circuits are switched sequentially into their second stable state via a clock signal issued by said clock generator.

17. The charge/discharge protection circuit of claim 14, wherein the outputs of said bistable flip-flop circuits deliver said first and said second control signal.

18. The charge/discharge protection circuit of claim 7, wherein, with the exception of capacitors, all circuit components are integrated on a chip.

* * * * *